A. HEMINWAY & W. A. DAGGETT.
Baking Pan.
No. 102,938.
Patented May 10, 1870.
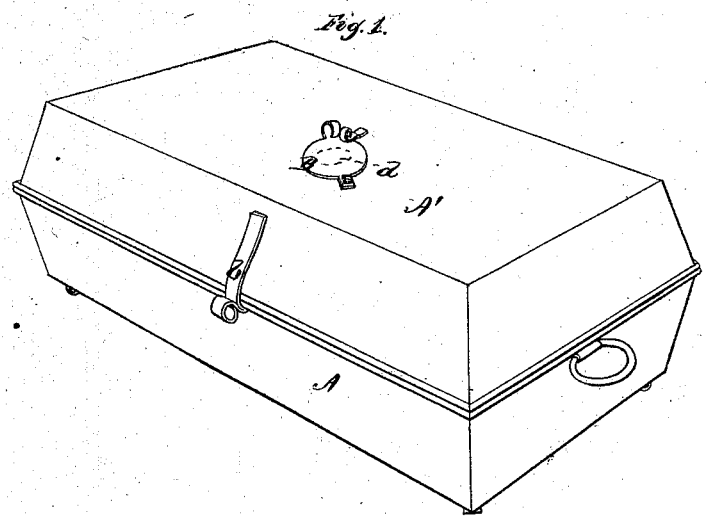
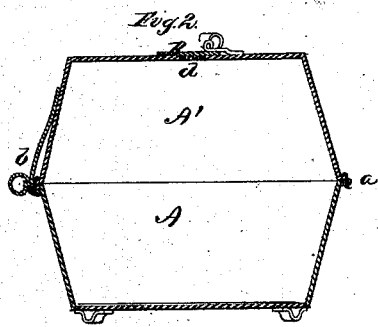
Witnesses
Jno. A. Ellis
J. W. White
Inventor
Allen Heminway and Wm. A. Daggett
Per
T. H. Alexander
Atty

United States Patent Office.

ALLEN HEMINWAY AND WILLIAM A. DAGGETT, OF LANAIS TOWNSHIP, NEW JERSEY, ASSIGNORS TO ALLEN HEMINWAY AND CALEB H. BENNETT, OF SAME PLACE.

Letters Patent No. 102,938, dated May 10, 1870.

IMPROVED BAKING-PAN.

The Schedule referred to in these Letters Patent and making part of the same.

*To all whom it may concern:*

Be it known that we, ALLEN HEMINWAY and WILLIAM A. DAGGETT, of Lanais, in the county of Cumberland and State of New Jersey, have invented certain new and useful Improvements in Baking-Pans; and we do hereby declare that the following is a full, clear, and exact description thereof, reference being had to the accompanying drawings and to the letters of reference marked thereon, which form a part of this specification.

The nature of our invention consists in the construction of baking-pans, so as to be perfectly self-sealing, air-excluding, and steam and gas-retaining.

In order to enable others skilled in the art to which our invention appertains to make and use the same, we will now proceed to describe its construction and operation, referring to the annexed drawings, in which—

Figure 1 is a perspective view;
Figure 2 is a transverse vertical section;
Figure 3 is a side view of the catch; and
Figure 4 is a section of the hinge.

A A' represent two pans of about equal size and shape, hinged on one side with adjustable hinges *a a*, and provided with a hasp or latch, *b*, on the other side.

In the top of the upper pan A' is a vent or orifice, *d*, with a pivoted lid or cover, B.

The object of the "self-sealing" is to exclude the air from the pan while bread is being baked, which is accomplished by the raising of the dough in the pan.

The object of the vent in the top of the upper pan is to allow the air to be expelled from the pan by the heat and steam during the first portion of the baking process. This vent is then closed, to retain the nutritious gases that would otherwise escape.

By using this pan, a large percentage of nutritious matter is saved, and bread baked in it will rise more than bread baked in any other pan, and be nearly crustless.

Having thus fully described our invention,
What we claim as new, and desire to secure by Letters Patent, is—

A baking-pan, composed of two pans hinged together on one side, and hasped or latched on the other, and the upper pan provided with a vent in its top, all substantially as and for the purposes herein set forth.

In testimony that we claim the foregoing as our own, we affix our signatures in presence of two witnesses.

ALLEN HEMINWAY.
WILLIAM A. DAGGETT.

Witnesses:
R. C. SYTHES,
T. T. CARTER.